L. A. HOERR.
BRAKE ROD JAW.
APPLICATION FILED DEC. 19, 1910.
983,996.
Patented Feb. 14, 1911.
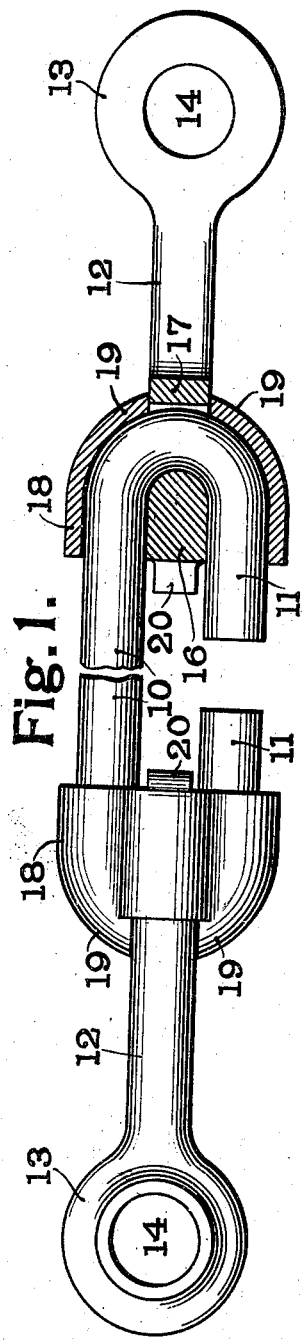
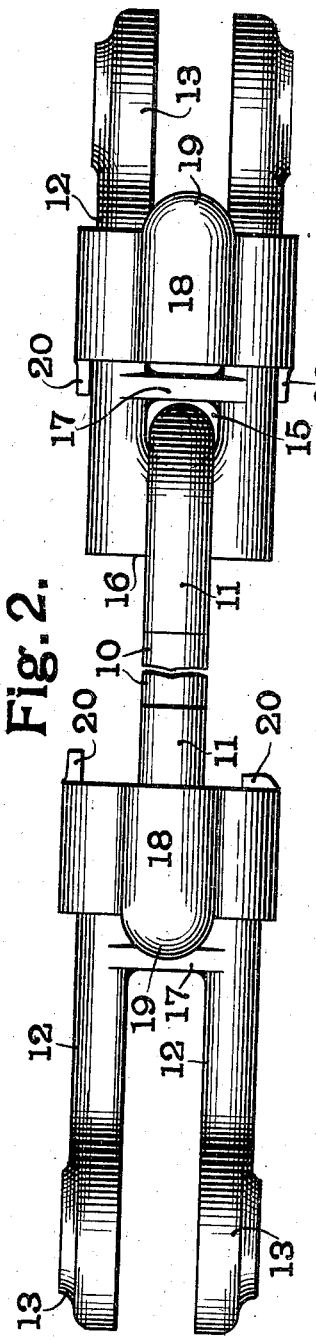
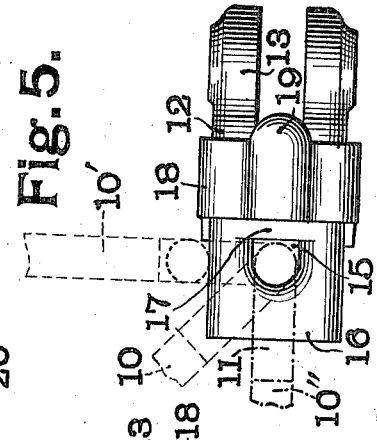
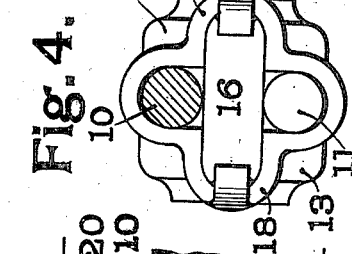
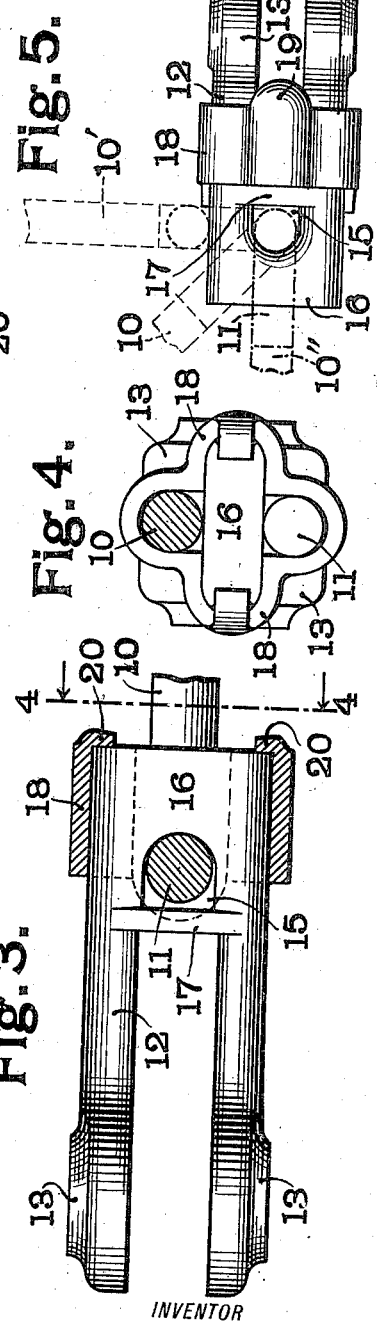
WITNESSES:
L. L. Mead
W. A. Alexander
INVENTOR
Louis A. Hoerr,
BY
Fowler & Huffman
ATTORNEYS

UNITED STATES PATENT OFFICE.

LOUIS A. HOERR, OF ST. LOUIS, MISSOURI.

BRAKE-ROD JAW.

983,996.

Specification of Letters Patent.

Patented Feb. 14, 1911.

Application filed December 19, 1910. Serial No. 598,206.

*To all whom it may concern:*

Be it known that I, LOUIS A. HOERR, a citizen of the United States, residing at St. Louis, Missouri, have invented a certain new and useful Brake-Rod Jaw, of which the following is such a full, clear, and exact description as will enable any one skilled in the art to which it appertains to make and use the same, reference being had to the accompanying drawings, forming part of this specification.

My invention relates to that class of brake rod jaws described in my prior application, Serial No. 575,873, filed Aug. 6, 1910, in which a sliding retaining member or keeper is used to prevent the spreading of the loop in the brake rod.

One object of the present invention is to so construct the brake rod jaw that it will receive directly both the pull and thrust of the brake rod, thus relieving the sliding keeper from the thrust of the rod.

Another object of my invention is to increase the strength and rigidity of the structure.

In the accompanying drawings there is illustrated one form of brake rod jaw made in accordance with my invention.

Figure 1 is a plan view, Fig. 2 is a view taken at right angles to Fig. 1, Fig. 3 is a view similar to one end of Fig. 2, but showing the keeper in section. Fig. 4 is a section taken on the line 4—4 of Fig. 3, and Fig. 5 is a view on reduced scale showing the manner of inserting the brake rod in the jaw.

Like marks of reference refer to similar parts of the several views in the drawings.

10 represents the brake rod; this rod 10 has one end bent to form an open loop 11, as best shown in Fig. 1. This loop 11 may be formed on the rod by machine at the shop so that the loops may be made uniform in size and the rods uniform in length.

Adapted to engage with each of the loops 11 is a brake rod jaw, each of these brake rod jaws consisting of a pair of arms 12, having enlarged ends 13, in which are formed openings 14, for the passage of the pins for pivoting the jaws to the brake beams or other connection. The arms 12 terminate in a flat shank provided with an opening 15 so as to leave a web 16 forming a seat for the loop 11, and an abutment 17 for receiving the thrust of the loop. In order to insert the rod in the jaw the free end of the loop 11 is first passed downwardly through the opening 15 and then drawn upward into the position shown at 10' in Fig. 5, after which the rod may be moved in the plane of the shank until it reaches the position indicated at 10'' in Fig. 5. In order to prevent the spreading of the loop and also the lateral movement of the rod, I provide a keeper 18 which conforms in shape to both the loop of the rod and the shank of the jaw, as best shown in Fig. 4. This keeper 18 is provided at its forward end with a pair of rounded portions 19 which bear against the forward end of the loop, as best shown in Fig. 1. At right angle with these portions 19 the keeper is provided with a pair of lugs 20 adapted to be bent to engagement with the rear end of the shank.

In order to assemble the rod and jaw the keeper 18 is slipped forward on to the arms 12 as is shown in Fig. 5, and at the right hand of Fig. 2, after which the rod is inserted in the jaw as hereinbefore described, and the keeper is slipped back until the rounded ends 19 engage the end of the loop 11. The lugs 20 are now bent over so as to engage with the end of the shank of the jaw. The keeper is thus prevented from moving backward by the rounded portions 19, and from moving forward by the lugs 20. The keeper not only prevents the spreading of the loop but also effectively prevents the lateral movement of the loop at the same time. The construction is such that both the pull and thrust of the rod is received directly by the jaw.

Having fully described my invention, what I claim as new and desire to secure by Letters Patent of the United States, is:

1. The combination with a brake rod having an open loop on the end thereof, of a brake rod jaw the shank of which is provided with a web forming a seat for the loop and an abutment forward of said seat to prevent the forward movement of the loop, and a keeper sliding on said shank and adapted to prevent the spreading of the loop.

2. The combination with a brake rod having an open loop on the end thereof, of a brake rod jaw the shank of which is provided with a web forming a seat for the loop and an abutment forward of said web for preventing the forward movement of the loop, and a keeper sliding on said shank and adapted to prevent the spreading of the loop; said keeper engaged with the forward end of the loop to prevent its rearward movement, and with said shank to prevent its forward movement.

3. The combination with a brake rod having an open loop on the end thereof, of a brake rod jaw the shank of which is provided with a web forming a seat for the loop and an abutment forward of said web to prevent the forward movement of said loop, and a keeper sliding on said shank and adapted to prevent the spreading of the loop; said keeper engaged with the forward end of the loop to prevent its rearward movement, and having a lug adapted to be bent into engagement with the rear end of the shank to prevent its forward movement.

In testimony whereof, I have hereunto set my hand and affixed my seal in the presence of the two subscribing witnesses.

LOUIS A. HOERR. [L. S.]

Witnesses:
W. A. ALEXANDER,
ELIZABETH BAILEY.